(12) United States Patent
Zhao et al.

(10) Patent No.: US 7,668,149 B2
(45) Date of Patent: Feb. 23, 2010

(54) METHODS AND APPARATUS FOR FACILITATING CONCURRENT PUSH-TO-TALK OVER CELLULAR (POC) GROUP COMMUNICATION SESSIONS

(75) Inventors: Wen Zhao, Kanata (CA); Xin Jin, Ottawa (CA)

(73) Assignee: Research In Motion Limited, Waterloo, Ontario, CA (US)

( * ) Notice: Subject to any disclaimer, the term of this patent is extended or adjusted under 35 U.S.C. 154(b) by 288 days.

(21) Appl. No.: 10/789,298

(22) Filed: Feb. 27, 2004

(65) Prior Publication Data

US 2005/0190740 A1 Sep. 1, 2005

(51) Int. Cl.
*H04L 12/56* (2006.01)
(52) U.S. Cl. ...................... 370/349; 455/518
(58) Field of Classification Search ............... 455/519, 455/556, 557, 512, 422, 518, 450; 370/330, 370/261, 384, 360, 337, 340, 341, 349
See application file for complete search history.

(56) References Cited

U.S. PATENT DOCUMENTS

| | | | |
|---|---|---|---|
| 5,809,018 A * | 9/1998 | Lehmusto | 370/330 |
| 2001/0010718 A1 | 8/2001 | Pinard et al. | |
| 2003/0125025 A1 | 2/2003 | Goubau et al. | |
| 2004/0002351 A1 | 1/2004 | Upp et al. | |
| 2005/0141464 A1 * | 6/2005 | Willey et al. | 370/337 |
| 2005/0176454 A1 * | 8/2005 | Chakraborty et al. | 455/518 |

FOREIGN PATENT DOCUMENTS

| | | |
|---|---|---|
| WO | WO 98/24252 | 11/1997 |
| WO | WO 99/66757 | 6/1999 |
| WO | WO 03/003651 | 1/2003 |

OTHER PUBLICATIONS

European Search Report For Application # 04251117.0-1249-, Sep. 9, 2004.

* cited by examiner

*Primary Examiner*—Sam Bhattacharya
(74) *Attorney, Agent, or Firm*—John J. Oskorep, Esq.

(57) ABSTRACT

Methods and apparatus for facilitating concurrent Push-to-talk over Cellular (PoC) group communication sessions for a mobile station (102) are disclosed. A first PoC communication session (550) for a first user group (504) is maintained while a second PoC communication session (552) for a second user group (506) is concurrently maintained, where the second user group (506) has at least one common member (516) with the first user group (504). The second user group (506) may have at least one member (518, 520) which is not included in the first user group (504). Through a user interface, a PoC user may select between the first and the second user groups (504 and 506) for communication or combine the communications. In an alternative embodiment, all of the members (518, 520, 522) of a second user group (604) may be included in a first user group (602). In a specific approach, encrypted data packets of a PoC communication sub-session are communicated during a PoC communication session. If a key for the encrypted data packets is known for the mobile station (102), the encrypted data packets are decrypted to facilitate the PoC communication sub-session involving the mobile station (102); otherwise the encrypted data packets are discarded.

26 Claims, 8 Drawing Sheets

METHODS AND APPARATUS FOR FACILITATING CONCURRENT PUSH-TO-TALK OVER CELLULAR (POC) GROUP COMMUNICATION SESSIONS

BACKGROUND

1. Field of the Invention

The present invention relates generally to Push-to-talk over Cellular (PoC) communications, and more particularly to methods and apparatus for facilitating concurrent PoC group communication sessions between mobile stations.

2. Description of the Related Art

A wireless communication device, such as a cellular telephone or mobile station, is capable of making and receiving voice calls and/or sending and receiving data over a wireless communication network. Recent developments have given such mobile stations the ability to communicate in "push-to-talk" (PTT) modes using Push-to-talk over Cellular (PoC) technology. PoC communication utilizes Voice-over-IP (VoIP) techniques which involve the communication of data packets carrying voice information. PoC communication is adapted for one-to-one talks or group talks which are session-based.

The end user of a mobile station may send an "invitation" for PoC communication to other potential "participants" who may "accept" or ignore the invitation. When an initiation is accepted, a PoC session is created between the two participants. Further acceptances of the invitation will expand the session into a group session having more than two participants. When a participant is in one PoC group session, however, the participant may be invited into another PoC group session of a different group. To enter into the other PoC group session, the participant has to exit from the current PoC group session in order to accept the other PoC group session. At least on some occasions, however, the participant may want to join the other PoC group session without dropping from the current PoC group session.

Accordingly, there is a resulting need for mobile station methods and apparatus for facilitating PoC group communication sessions that overcome the deficiencies of the prior art.

SUMMARY

Methods and apparatus for facilitating concurrent Push-to-talk over Cellular (PoC) group communication sessions are described herein. In one illustrative example, a first PoC communication session for a first user group is maintained while a second PoC communication session for a second user group is concurrently maintained, where the second user group has at least one common member with the first user group. The second user group may also have at least one member which is not included in the first user group or, alternatively, all of the members of the second user group may be included in the first user group.

A related method of processing PoC group communication sessions for a mobile station involves maintaining a first PoC group communication session; receiving or sending an invitation into a second PoC group communication session; and in response to an invitation acceptance into the second PoC group communication session, facilitating the participation into the second PoC group communication session without terminating the first PoC group communication session.

In one specific approach for processing concurrent PoC sessions, encrypted data packets of a PoC communication sub-session are communicated during a PoC communication session. If a key for the encrypted data packets is known for a mobile station, the encrypted data packets are decrypted to facilitate the PoC communication sub-session. Otherwise, the encrypted data packets are discarded. This approach facilitates multiple concurrent talk groups for an end user despite only a single PoC session being maintained by the network, to thereby save network resources.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for facilitating concurrent Push-to-talk over Cellular (PoC) group communication sessions are described herein. In one exemplary method, a first PoC communication session for a first user group is maintained while a second PoC communication session for a second user group is concurrently maintained, where the second user group has at least one common member with the first group. The second user group may also have at least one member which is not included in the first user group or, alternatively, all of its members may be included in the first user group. Further details are described below.

Figure 1:
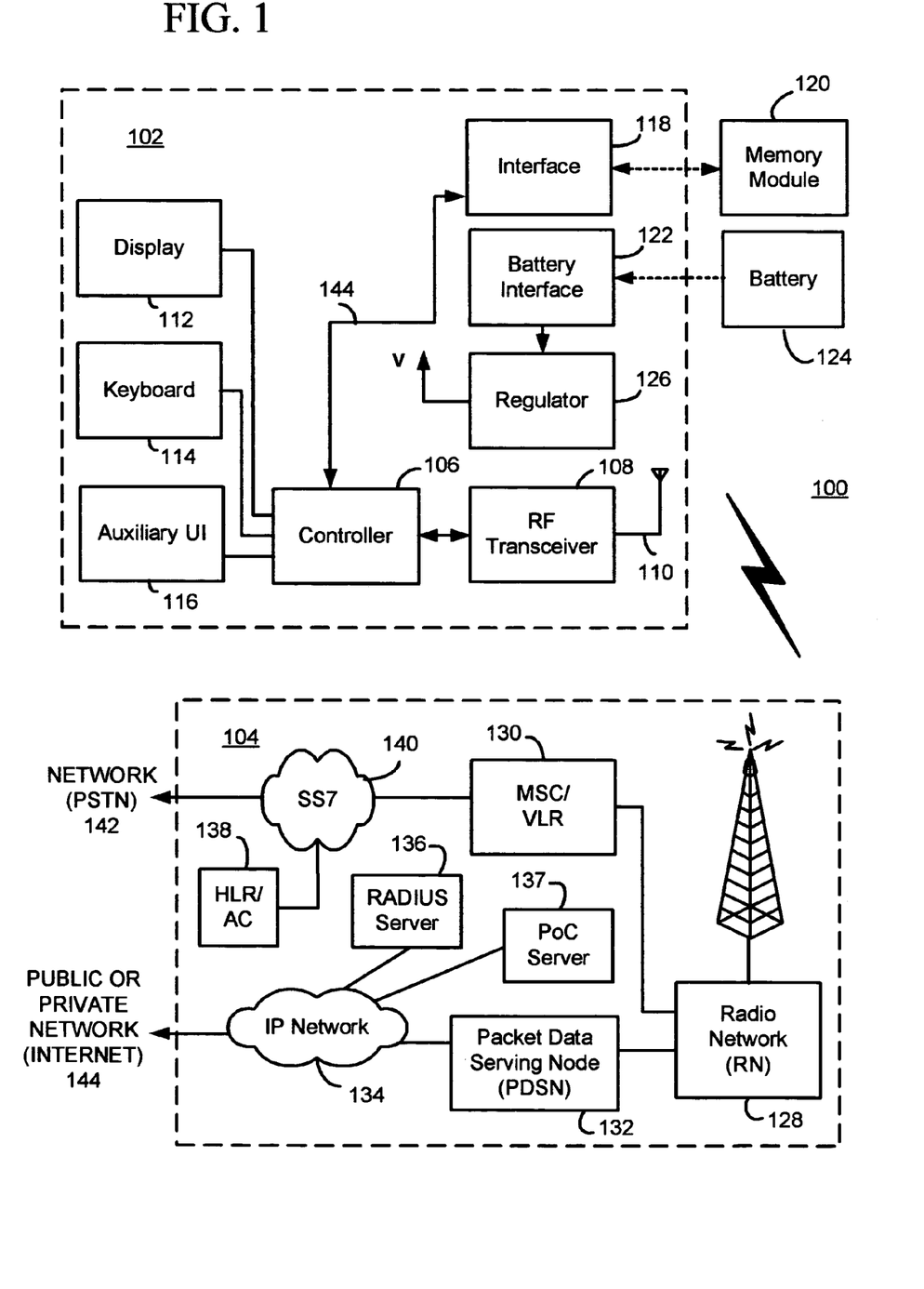
FIG. 1 is a block diagram which illustrates pertinent components of a wireless communication network and a mobile station which communicates within this network, both configured to facilitate Push-to-talk over Cellular (PoC) communications.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
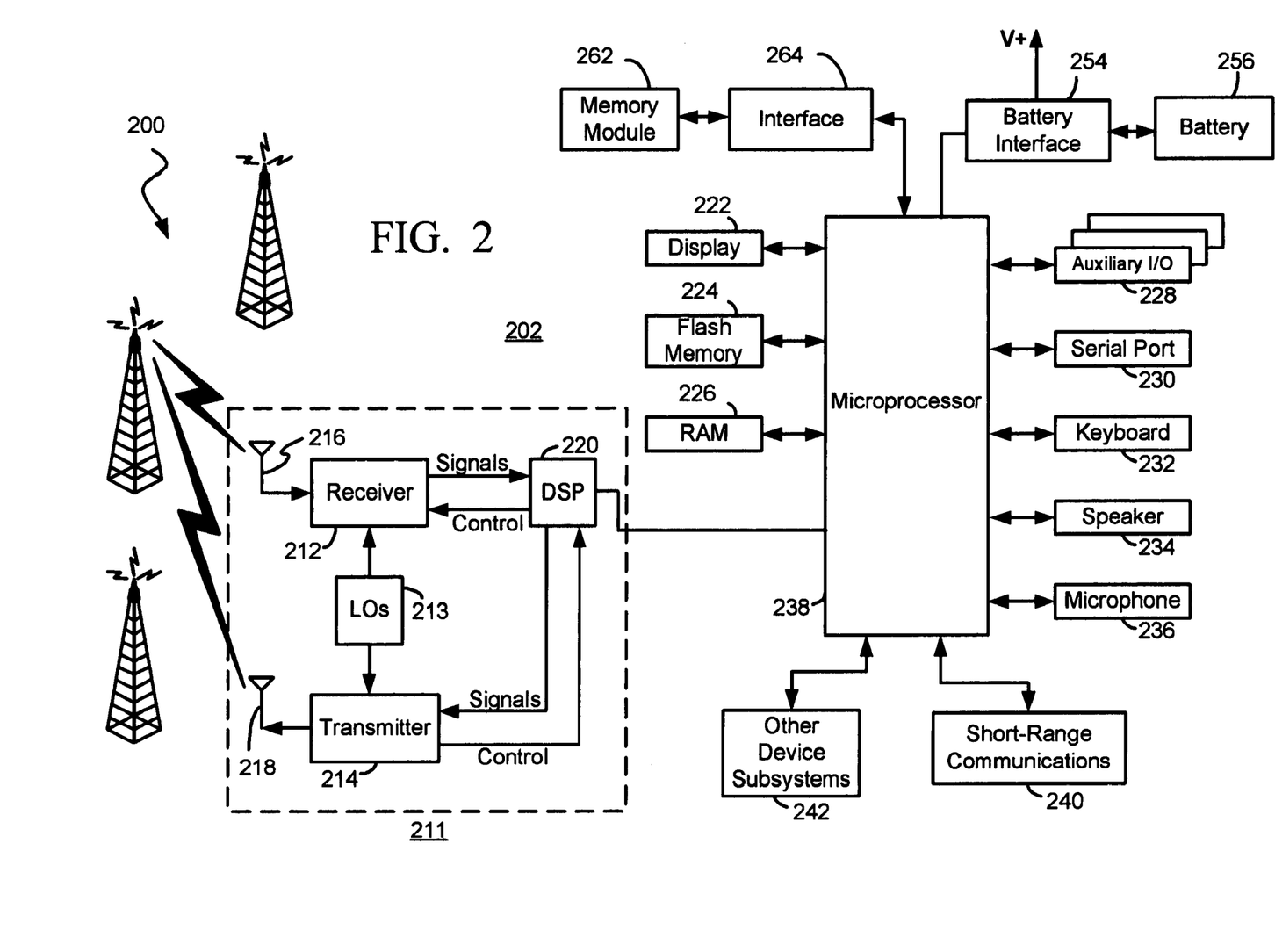
FIG. 2 is a more detailed diagram of the mobile station which may communicate within the wireless communication network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with, as will be described in more detail later in relation to FIGS. 3 and 4.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
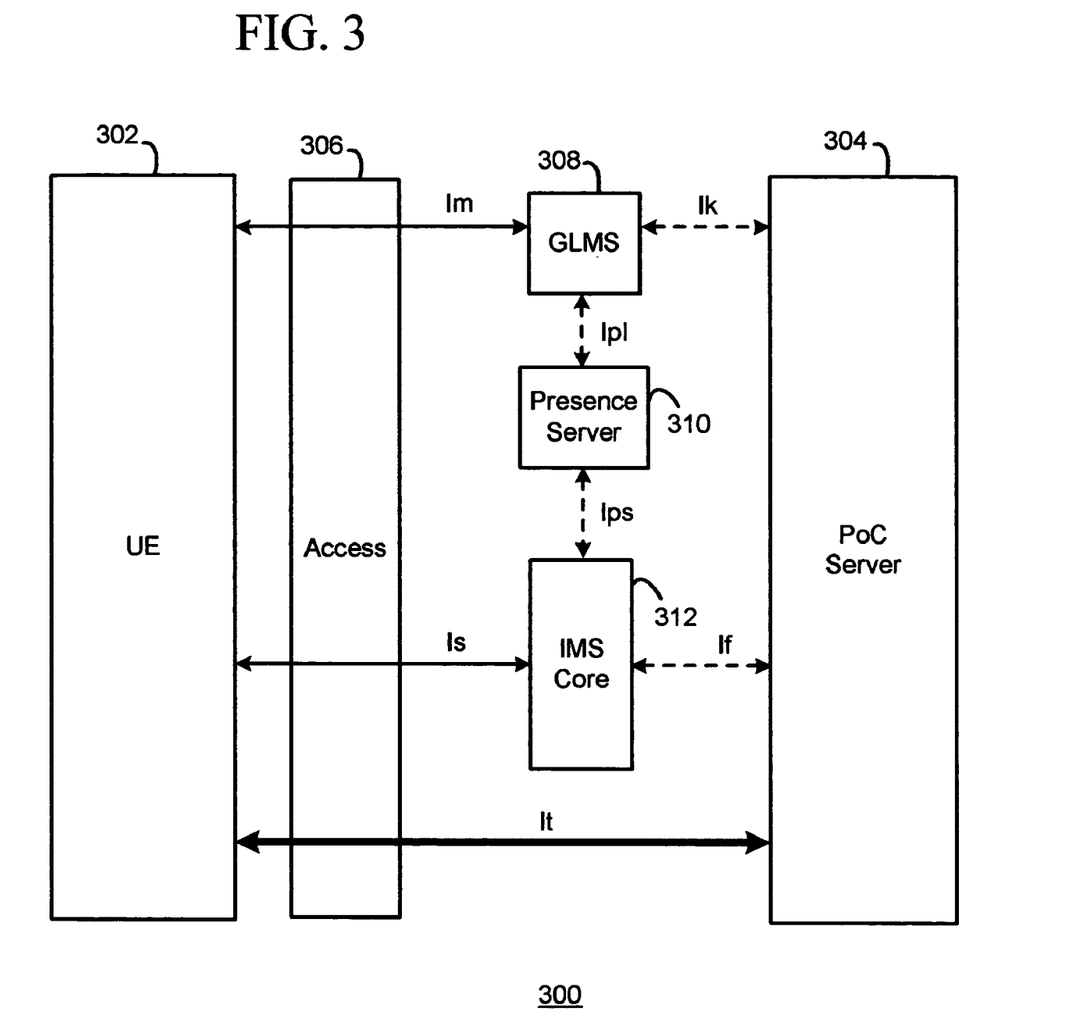
FIG. 3 is a block diagram of system components pertaining to PoC communication sessions of the present application.

FIG. 3 is a block diagram of relevant system components 300 pertaining to Push-to-talk over Cellular (PoC) communications of the present application. System components 300 include user equipment (UE) 302 which represents a mobile station, a Push-to-talk over Cellular (PoC) server 304, an access 306, a Group and List Management Server (GLMS) 308, an IP Multimedia Subsystem (IMS) core 312, and a presence server 310. Some of these components may be optional or not necessary for fundamental operation.

A PoC communication session is a session connection between end users of a UE 302, referred to as session "participants", who communicate one at a time in a half-duplex manner. PoC communication utilizes Voice over IP (VoIP) technology which involves the communication of data packets carrying voice information. UE 302 is terminal equipment (e.g. a mobile station) which includes PoC application client software, which includes functionality of the present application but otherwise utilizes conventional techniques. IMS core 312 includes a plurality of Session Initiation Protocol (SIP) proxies and SIP registrars. The first point of contact for UE 302 is one of the proxies in IMS core 312 that is configured on UE 302 as the outbound proxy. In the IMS architecture, the outbound proxy is known as the Proxy-CSCF (P-CSCF). IMS Core 312 performs the following functions: (1) routing of SIP signaling between UE 302 and PoC server 304; (2) termination of SIP compression from UE 302; (3) authentication and authorization; (4) maintenance of the registration state and the SIP session state; and (5) reporting to the charging system. UE 302 sends all its SIP messages to the IP address of the outbound proxy after resolving the SIP Uniform Resource Identifier (URI) of the outbound proxy to an IP address.

End users use GLMS 308 to manage groups, contact lists, and access lists. A contact list is a type of address book that may be used by end users to establish an instant talk session with other PoC users or PoC Groups. An end user may have one or several contact lists including identities of other PoC users or PoC groups. Contact list management includes operations to allow UE 302 to store and retrieve the contact lists located in GLMS 308. End users can define PoC groups. An end user may select one group from the list to initiate an instant group talk session or a chat group talk session, depending on the type of group. An access list is used by the end user as a means of controlling who is allowed to initiate instant talk sessions to the end user. An access list contains end user defined identities of other end users or groups. The end user may have one blocked identities list and one granted identities list.

PoC server 304 includes functionality to perform the PoC service. PoC Server 304 typically performs functions such as: (1) end-point for SIP signaling; (2) end-point for real-time transport protocol (RTP) and RTP Control Protocol (RTCP) signaling; (3) SIP session handling; (4) policy control for access to groups; (5) group session handling; (6) access control; (7) do-not-disturb functionality; (8) floor control functionality (floor control is a control mechanism that arbitrates requests, from the UEs, for the right to speak); (9) talker identification; (10) participant information; (10) quality feedback; (11) charging reports; and (12) media distribution. Presence server 310 manages presence information that is uploaded by presence user/network/external agents, and is responsible for combining the presence-related information for a certain presentity from the information it receives from multiple sources into a single presence document.

An Is interface supports the communication between UE 302 and IMS core 312. This communication includes SIP procedures which support the PoC features. The protocol for the Is interface is Session Initiation Protocol (SIP). Is signaling is transported on User Datagram Protocol (UDP). The protocols over an If interface support the communication between IMS core 312 and PoC server 304 for session control. The protocols over an It interface support the transport of talk bursts, floor control, and link quality messages between UE 302 and PoC Server 304. The protocols over an Im interface support the communication between UE 302 and GLMS 308 for the purpose of managing the groups, contact lists and access lists and Do-not-Disturb indication. HTTP/XML protocols are utilized for these purposes. The protocols over an Ik interface support the communication between PoC Server 304 and GLMS 308, enabling PoC server 304 to retrieve the groups and access lists from GLMS 308. The protocols over an Ips interface enable the uploading of the registration status from IMS core 312 to presence server 310 and the dissemination of the presence information between presence server 310 and UE 302. The protocol over an Ipl interface enables the uploading of Do-not-Disturb status and granted/blocked access lists from GLMS 308 to presence server 310. The group identity used on the Is interface between the UE and IMS core for group talk is generated by GLMS 308.

Each entity in the PoC system is assigned one or more IP addresses belonging to public or private IP realms. On the other hand, a end user may address another user by a phone number. UE 302 sends a phone number to IMS core 312 in a TEL Uniform Resource Locator (URL). The phone number may use the international E.164 format (prefixed with a '+' sign) or a local format using a local dialing plan and prefix. IMS core 312 interprets the phone number with a leading '+' to be an E.164 number. Addressing by TEL URL for a PoC session requires that PoC Server 304 can resolve the TEL URL to a SIP URI, for instance by using DNS/ENUM or other local data base. A phone number in a local format is converted to the E.164 format before DNS/ENUM is used.

End users may initiate PoC talk sessions. An INVITE request on the Is interface contains an "Accept-Contact" header with a media feature tag indicating the PoC service. IMS core 312 is able to identify the request as a PoC communication by inspecting the Accept-Contact header. A Request-URI of the INVITE contains either the pre-configured ad-hoc identity (for instant personal talk and ad-hoc instant group) or a group identity (for instant group talk or chat group talk). Early session establishment is used for having a session available for quick connection establishment using "REFER". The early session establishment's INVITE does not have any referred party field and can be differentiated from this against other INVITEs. A transient group identity is generated by PoC server 304 and distributed to UE 302 in the "Contact" header. From an initiating UE 302, the public user identity of the inviting user is included in the "From" header. On the signaling towards the invited user, the "From" header includes either the public user identity (instant personal talk, ad-hoc instant group) or the group identity (instant group talk or being added to a chat group).

Other than the inventive techniques described herein, the PoC architecture and signaling may be the same as is conventional as described in current standard specifications such as Push-to-talk over Cellular (PoC), Architecture, PoC Release 1.0—Architecture V1.1.0 (2003-08) Technical Specification; and Push-to-talk over Cellular (PoC), Signaling Flows, PoC Release 1.0—Signaling Flows V1.1.3 (2003-08) Technical Specification.

Figure 4:
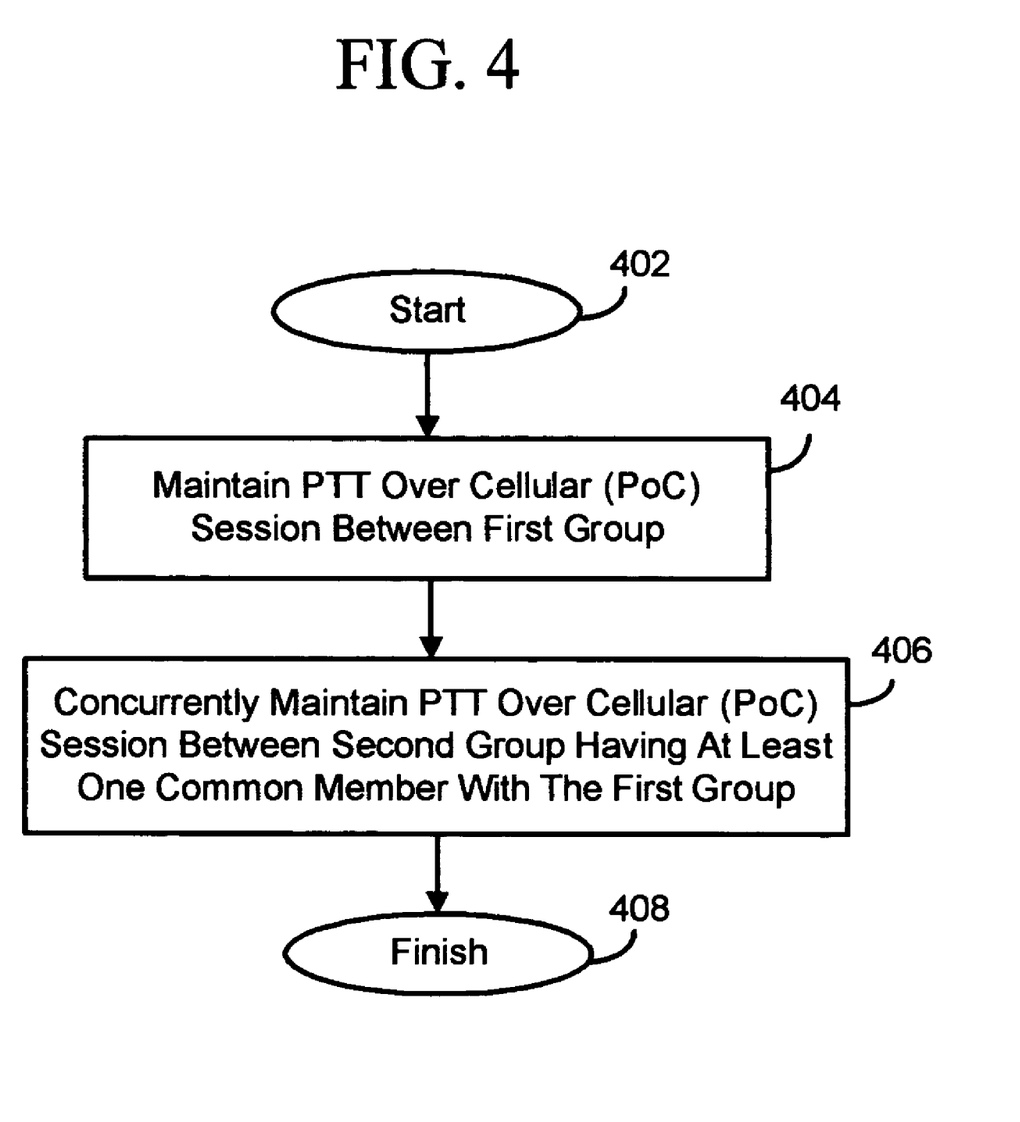
FIG. 4 is a flowchart which describes a general method of facilitating concurrent PoC group communication sessions between mobile stations.

Within the context of the architecture above, FIG. 4 is a flowchart which describes a general method of facilitating concurrent PoC group communication sessions between mobile stations in accordance with the present application. This described method may be performed by a mobile station (e.g. FIGS. 1 and 2) or a PoC server (e.g. FIGS. 1 and 3). In addition, the method may be embodied in a computer program product which includes a computer storage medium (e.g. computer disk or memory) and computer instructions stored in the computer storage medium.

Beginning at a start block 402 of FIG. 4, a first Push-to-talk over Cellular (PoC) communication session between a first user group is maintained (step 404). In addition, a second PoC communication session between a second user group is concurrently maintained, where the second user group has at least one common member with the first user group (step 406). For each different PoC group session, a separate session ID and group ID are maintained in memory in association with the other pertinent session information. In a first embodiment relating to FIG. 4, the second user group has at least one member which is not included in the first user group (described later below in relation to FIG. 5). In a second embodiment relating to FIG. 4, all members of the second user group are included in the first user group (described later below in relation to FIG. 6 as well as FIG. 7).

The second PoC communication session may be set up by a PoC user who is already a participant in the first PoC communication session. In one scenario, the PoC user accepts an invitation to the second PoC communication session which was originated by another PoC user who may or may not be a participant in the first PoC communication session. In another scenario, the PoC user of the first PoC communication session sends an invitation to one or more members of the second PoC communication session, which is accepted by at least one member of the second PoC communication session. As apparent, a related method of processing PoC sessions in a mobile station involves maintaining a first PoC group communication session; receiving or sending an invitation into a second PoC group communication session during the first PoC group communication session; and in response to an invitation acceptance into the second PoC group communication session, facilitating the participation into the second PoC group communication session without terminating the first PoC group communication session.

As will be described in more detail below, the PoC sessions may be processed in either a combined or separate manner. If combined processing is utilized, then the mobile station processes and outputs audible signals from both PoC sessions simultaneously. If separate processing is utilized, then the mobile station processes and outputs audible signals from only a single PoC session at a given time. The manner in which the sessions are processed may be predetermined and fixed. That is, only combined PoC session processing or only support separate PoC session processing may be supported. Alternatively, both types of PoC session processing may be supported where only one type of processing is utilized at a given time as selected by the end user at user interface.

One of two different ways to facilitate such session processing may be utilized. One approach is at the mobile station and the other approach is at the PoC server. The former approach may be more straightforward to implement but may utilize additional radio resources compared to the latter approach. If the mobile station approach is utilized, the PoC server sends data packets from all possible group sessions in which the mobile station may participate. The PoC user of the mobile station selects, at the user interface, which session should be heard at the mobile station or whether the group sessions should be combined. In response, the mobile station processes the data packets in the combined or separate manner accordingly. The selection by the PoC user at the user interface may be performed at any time to change the PoC session configuration. Whenever the PoC user selects a new session configuration at the user interface, the mobile station changes in the PoC session processing accordingly.

If the PoC server approach is utilized, the mobile station sends an instruction message to the PoC server in response to user input corresponding to which session should be heard at the mobile station or whether the group sessions should be combined. Based on the decisions made at the user interface of the mobile station, the PoC server accordingly selects data packets of the chosen PoC group session or combines audio signals of data packets from multiple PoC group sessions, and causes the resulting/selected data packets to be sent to the mobile station through a single channel. Data packets associated with an unused or discarded session is discarded at the PoC server and not sent over-the-air. The selection by the end user at the user interface may be performed at any time to change the PoC session configuration. Whenever the PoC user selects a new session configuration at the user interface, the mobile station sends a new instruction to the PoC server to request a change in the session configuration.

In addition to choosing what group session to listen to, a PoC user may also select which group session to speak to or whether to combine sessions. Such decisions may similarly be made at the user interface of the mobile station. Transmitted data packets may have a field which identifies the session ID of the associated PoC group session so that they may be processed accordingly.

Figure 5:
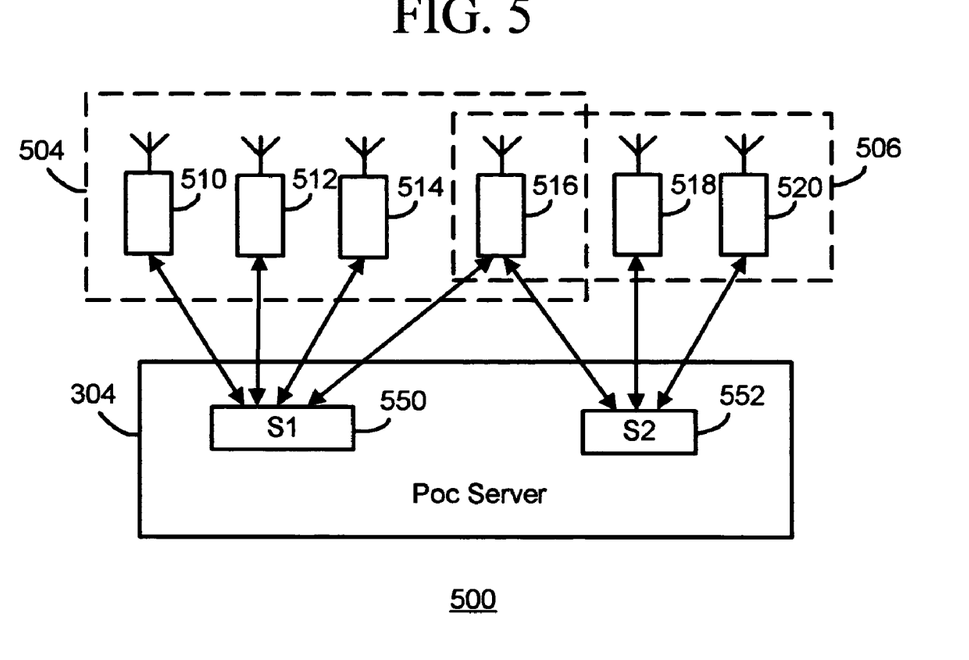
FIG. 5 is a system diagram showing two concurrent PoC talk groups having at least one common member and at least one uncommon member between groups.

FIG. 5 is a system diagram 500 showing two concurrent PoC talk groups 504 and 506 utilizing the same PoC server 304. PoC talk group 504 includes mobile stations 510, 512, 514, and 516 of a PoC group session S1 550 facilitated by PoC server 304. On the other hand, PoC talk group 506 includes mobile stations 516, 518, and 520 of a PoC group session S2 552 facilitated by PoC server 304. Thus, PoC talk groups 504 and 506 have at least one common member 516. In this scenario, PoC talk groups 504 and 506 also have at least one uncommon member between groups. In particular, mobile stations 510, 512, and 514 of PoC talk group 504 are not within PoC talk group 506 and mobile stations 518 and 520 of PoC talk group 506 are not within PoC talk group 504. Thus, communication privacy is maintained within PoC talk group 504 and within PoC talk group 506, where mobile station 516 has communication for both sessions.

The techniques described earlier above will be further described in relation to FIG. 5. The following discussion relates to peforming PoC session processing at the mobile station (as opposed to at the PoC server). Mobile station 516 of FIG. 5 may process received data packets of both PoC communication sessions in either a combined or separate manner. The manner in which the sessions are processed (i.e. combined or separate) may be selected by the end user at the user interface of mobile station 516. If the combined processing approach is performed by mobile station 516, mobile station 516 receives and processes data packets from both PoC group sessions 504 and 506 substantially simultaneously and mixes the audio for combined output at its speaker. Here, the same PoC server 304 regularly sends mobile station 516 data packets from two different PoC group sessions S1 and S2 substantially at the same time. As an option, if mobile station 516 has stereo audio capability it may provide voice signals of the two different PoC group sessions S1 and S2 through the left and right speaker channels, respectively. If the separate processing approach is performed by mobile station 516, mobile station 516 processes data packets from only one PoC group session at a time, discarding data packets from the other PoC group session. The single PoC group session which is heard may be selected by the end user at the user interface of mobile station 516. Again, this type of processing is similar in experience as placing a telephone call "on hold" to accept another telephone call, with the ability to switch back and forth between calls.

On the other hand, PoC server 304 may perform the PoC session processing instead of mobile station 516. That is, PoC server 304 may be operative to process PoC group sessions S1 and S2 using either the combined or separate approach. The manner in which the PoC communication sessions are processed may be selected in response to an end user's selection at the user interface of mobile station 516, which causes a processing instruction message to be sent from mobile station 516 to PoC server 304. If the combined processing approach is performed by PoC server 304, PoC server 304 receives and processes data packets from both PoC group sessions S1 and S2 substantially simultaneously, mixes audio signals of both sessions, reconstructs data packets having the combined audio and sends them to mobile station 516. Mobile station 516 may generally process the data packets as is conventional. Thus, PoC server 304 may send mobile station 516 data packets which have mixed audio signals from two different PoC group sessions S1 and S2. If the separate processing approach is performed by PoC server 304, PoC server 304 processes data packets from only one PoC group session at a time, discarding data packets from the other PoC group session. The single PoC group session which is heard at mobile station 516 may be selected by the end user at the user interface of mobile station 516, which causes a processing instruction message to be sent from mobile station 516 to PoC server 304. Again, this type of processing is similar in experience as placing a telephone call "on hold" to accept another telephone call, with the ability to switch back and forth between calls.

Figure 6:
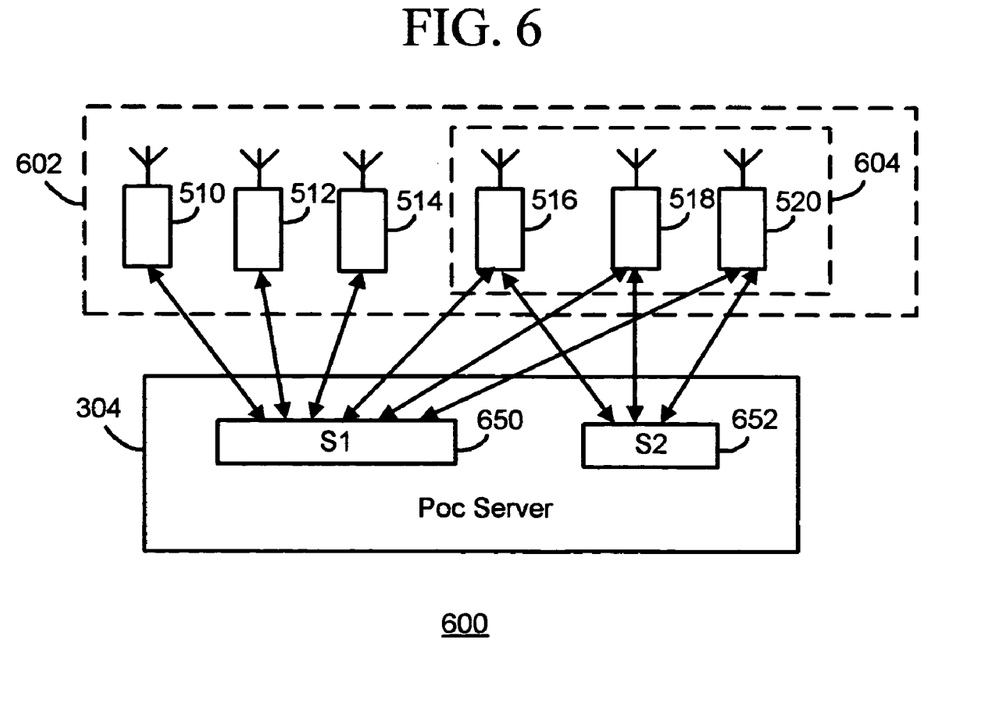
FIG. 6 is a system diagram showing two concurrent PoC talk groups where all members in one group are included within the other group.

FIG. 6 is a system diagram 600 showing two concurrent PoC talk groups 602 and 604 where all members in one group 604 are included within the other group 602. PoC talk group 602 includes mobile stations 510, 512, 514, 516, 518, and 520 of a PoC group session S1 650 facilitated by PoC server 304. On the other hand, PoC talk group 604 includes mobile stations 516, 518, and 520 of a PoC group session S2 652 facilitated by PoC server 304. Thus, PoC talk groups 602 and 604 have at least one common member 516, 518, and 520, and in fact all members of PoC talk group 604 are included within PoC talk group 602. Thus, communication privacy is maintained within PoC talk group 604 where mobile stations 516, 518, and 520 have the ability to communicate in both sessions. In FIG. 6, the mobile stations or PoC server may process data packets of both PoC communication sessions in a separate manner, as described in relation to FIG. 5. Which session of FIG. 6 is heard may be selected by the end user at the user interface. Further, the session configuration of FIG. 6 may be implemented utilizing the techniques described below in relation to FIG. 8.

Figure 7:
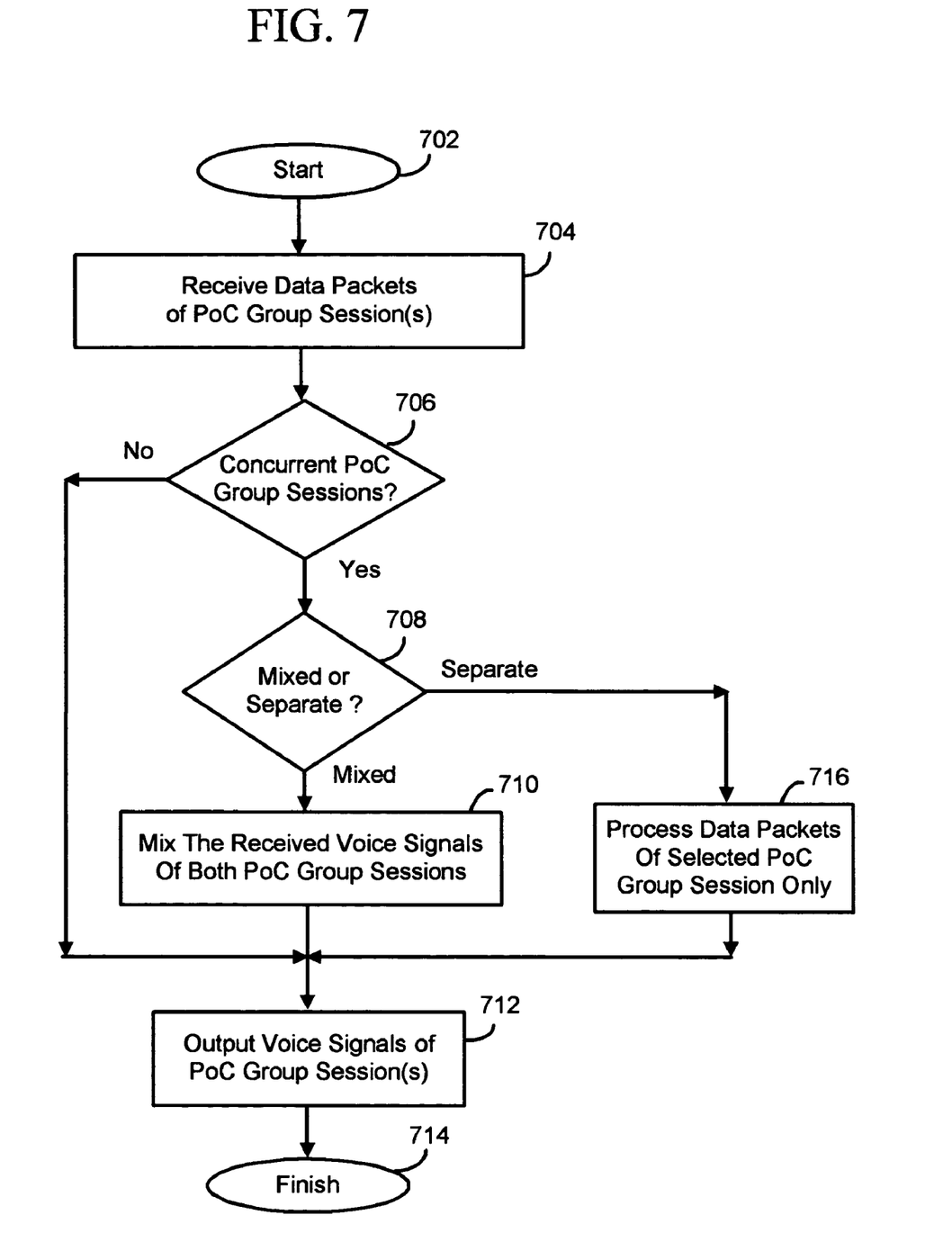
FIG. 7 is a flowchart which describes a method of processing data packets of concurrent PoC group communication sessions for mobile stations.

FIG. 7 is a flowchart which describes a method of processing data packets of concurrent PoC group communication sessions at a mobile station. Beginning at a start block 702 of FIG. 7, a mobile station receives data packets of a PoC group communication session (step 704). If the mobile station is currently maintaining no more than one PoC communication session as tested in step 706, then the flowchart leads to step 712; otherwise two or more PoC group communication sessions are being maintained and the flowchart continues to step 708. The decision-making in step 706 may be performed by identifying relevant session data which is maintained in memory of the mobile station. If two or more different sets of session data are stored (i.e. with two or more different session IDs and/or group IDs), for example, then two or more PoC group communication sessions are being maintained.

As described earlier above, a mobile station may process received data packets of both PoC group communication sessions in either a combined manner or a separate manner. The manner in which the sessions are processed may be predetermined and fixed by mobile station operation. That is, the mobile station may support only combined session processing or only support separate session processing. Alternatively, the mobile station may support both types of session processing where only one type is utilized as selected by the end user at user interface. If the combined session processing is utilized as identified at step 708, the mobile station processes data packets from both PoC group sessions substantially simultaneously and combines/mixes these signals (step 710).

If the separate session processing is utilized as identified at step 708, the mobile station processes data packets from only one PoC group session at a time (step 716), discarding data packets from the other PoC group session. With separate session processing, the end user of the mobile station can select between the different PoC group sessions at the user interface. The user interface may be or include one or more keys of a keypad and/or a mouse cursor and a visual display of the mobile station (see discussion with respect to FIG. 9 below), as examples. Again, this type of processing is similar in experience as placing a telephone call "on hold" to accept another telephone call, with the ability to switch back and forth between calls.

Regardless of whether the concurrent PoC group sessions are handled in the combined or separate manner, the mobile station outputs audible voice signals from its speaker for the PoC group session(s) (step 712). The flowchart ends at a finish block 714. Note that, with separate session processing, audible voice signals are not heard at the speaker of the mobile station for the PoC group session associated with the discarded data packets. Also note that the end user may also be able to select which session in which to speak, or select one or all sessions in which to speak at the same time. The transmitted voice data packets may shave a field to identify the intended session ID(s) for further processing.

Although the method of FIG. 7 describes PoC session processing at the mobile station, the PoC session processing may be performed similarly by the PoC server as described earlier above. If the PoC server performs the method of FIG. 7, step 712 for "Outputting Voice Signals" is replaced by the sending of data packets to the mobile station for further processing. Also, the PoC server may receive instruction messages from the mobile station based on the end user's input corresponding to which PoC group session to select or whether to combine the PoC group sessions.

Figure 8:
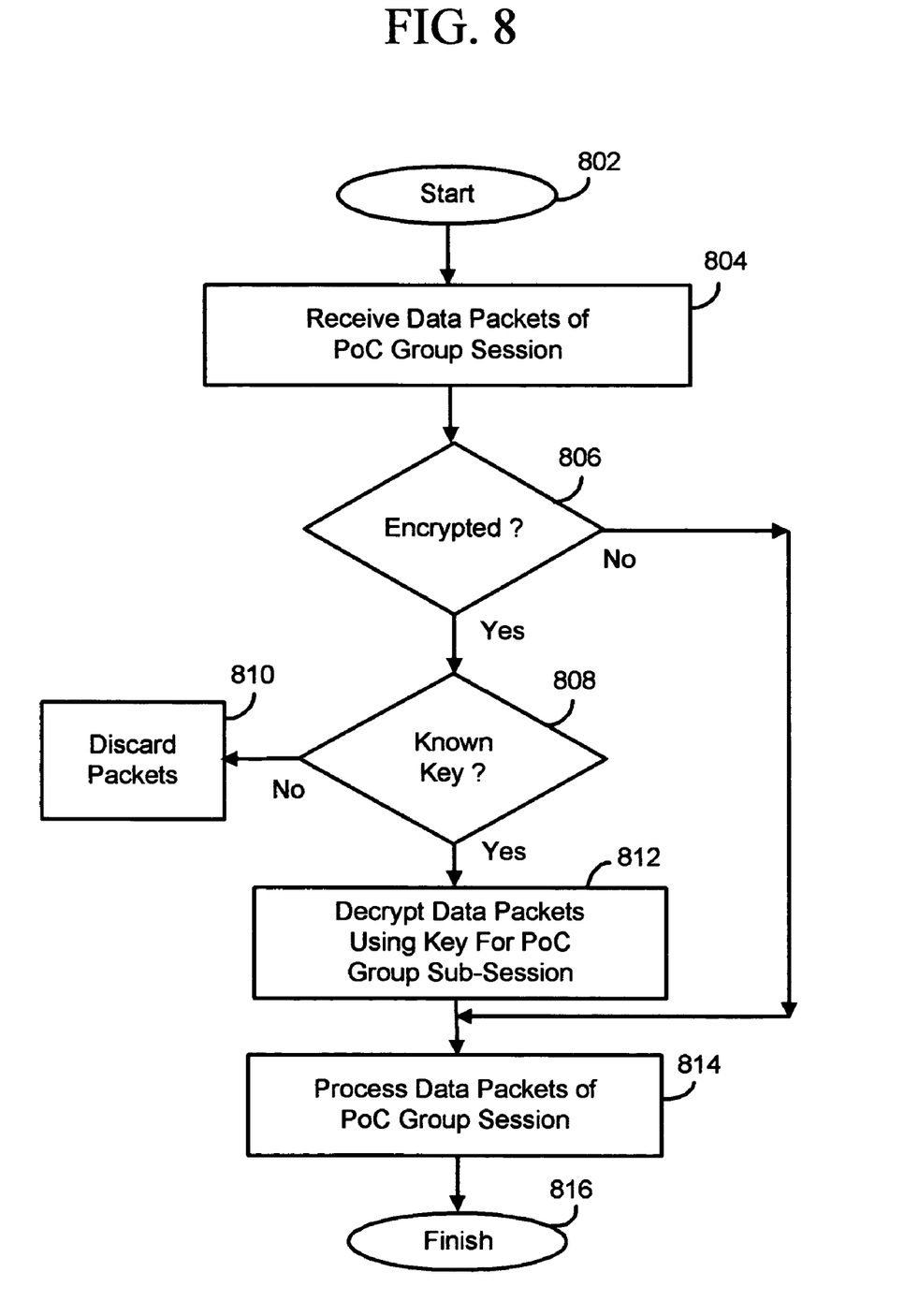
FIG. 8 is a flowchart which describes a specific technique for processing data packets of concurrent PoC group communication sessions at a mobile station using encryption techniques.

FIG. 8 is a flowchart which describes a specific technique for processing data packets of concurrent PoC group communication sessions at a mobile station, which involves the use of encryption techniques where separate group sessions need not be maintained by the PoC server. This technique may especially be implemented for the session configuration described above in relation to FIG. 6. Beginning at a start block 802 of FIG. 8, a mobile station receives data packets of a PoC group communication session (step 804). The mobile station identifies whether these data packets are encrypted (step 806). The mobile station may determine this, for example, based on data which exists in an encryption ID field of an incoming data packet. If the data packets are not encrypted as identified in step 806, then the mobile station processes the data packets normally for PoC group session processing (e.g. in accordance with steps 706-712 of FIG. 7). If the data packets are encrypted as identified in step 806, then the mobile station identifies whether it has a valid key for decrypting the encrypted data packets (step 808). The mobile station may determine this, for example, based on the data which exists in the encryption ID field of the data packet and any prestored encryption ID in its memory. If the mobile station does not have a valid key for decrypting the data packets, then the mobile station discards the data packets (step 810). If the mobile station has the valid key (e.g. the data in the encryption ID field matches that of the prestored encryption ID in its memory) as tested in step 808, the mobile station proceeds to decrypt the data packets using the stored key (step 812). These decrypted data packets are for a PoC group sub-session within the PoC group session (e.g. PoC talk group 604 within PoC talk group 602 of FIG. 6). Next, the mobile station proceeds to process the decrypted data packets for the PoC group sub-session (step 814). For example, the mobile station may output audio signals corresponding to the data packets at its speaker. The flowchart ends at a finish block 816.

Figure 9:
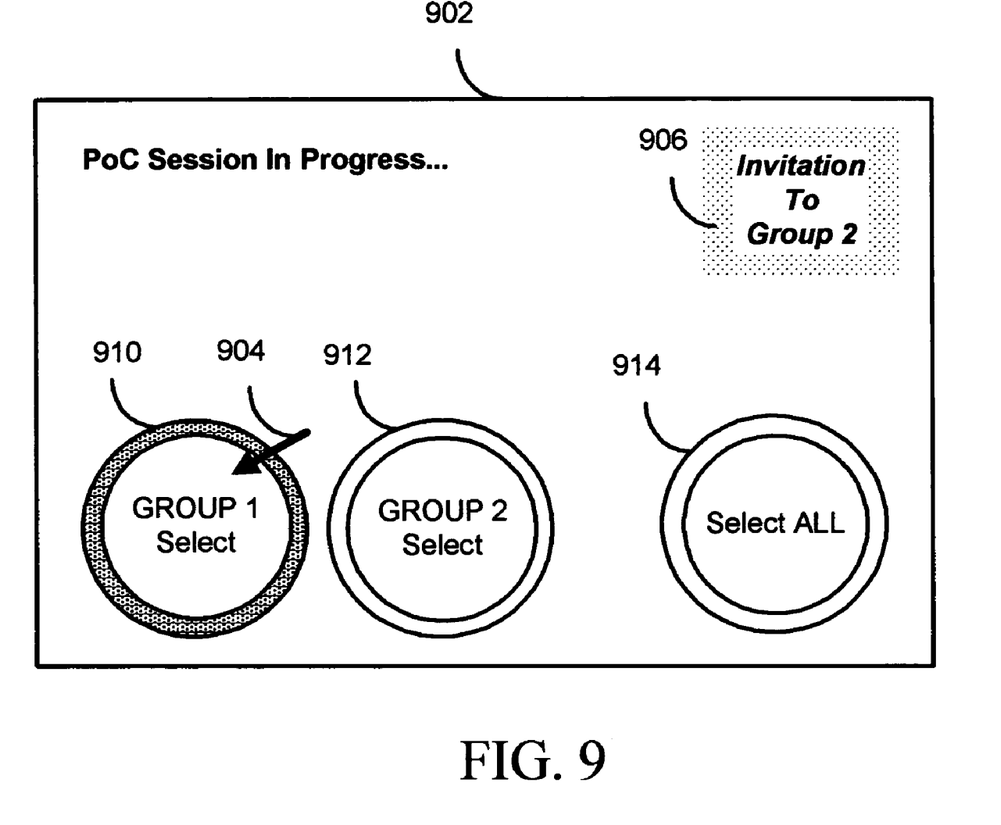
FIG. 9 is an illustration of information displayed in a visual display of a mobile station for PoC session processing.

FIG. 9 is an illustration of information displayed in a visual display 902 of a mobile station for PoC session processing. Note that GROUP 1 and GROUP 2 sessions are being concurrently maintained. Visual display 902 has display items 910, 912, and 914 which are utilized for selecting which PoC group session(s) to process and for indicating which PoC group session(s) is currently being processed. Display item 910 is for selecting/indicating the GROUP 1 session, display item 912 is for selecting/indicating the GROUP 2 session, and display item 914 is for selecting/indicating ALL group sessions. In FIG. 9, display item 910 corresponding to the GROUP 1 session is highlighted for indicating that the GROUP 1 session (and not GROUP2) is currently being processed. A cursor 904 may be utilized along with one or more switches (keys, spin-wheel, etc.) of the mobile station for the end user selection of PoC session processing. A display item 906 is for indicating any currently received PoC session invitations.

As apparent, all of the components and techniques as described are useful in that an end user may invite, accept, and participate in at least two PoC group sessions simultaneously. The end user no longer has to exit from an existing PoC group session when interested in an invitation into or the creation of a new PoC group session. The received audible voice signals of both PoC group sessions may be processed separately or mixed for the participation in some or all communication sessions. The end user may select which type of processing should be utilized and which sessions to participate in at the user interface.

Final Comments. Methods and apparatus for facilitating concurrent Push-to-talk over Cellular (PoC) group communication sessions have been described. A first PoC communication session for a first user group is maintained while a second PoC communication session for a second user group is concurrently maintained. The second user group has at least one common member with the first group. The second user group may also have at least one member which is not included in the first user group or, alternatively, all of its members may be included in the first user group. This method may be performed by a PoC server of a communication network or by a mobile station corresponding to the at least one common member. The method is embodied in a computer program product comprising a computer storage medium and computer instructions stored in the computer storage medium.

A related method of processing PoC communication sessions comprises the acts of maintaining a first PoC group communication session; receiving an invitation into a second PoC group communication session; receiving a user input for accepting the invitation into the second PoC group communication session; and in response to receiving the user input for accepting the invitation into the second PoC group communication session, facilitating the participation into the second PoC group communication session without terminating the first PoC group communication session. Conversely, the method may include the acts of maintaining a first PoC group communication session; sending an invitation into a second PoC group communication session during the first PoC group communication session; and in response to receiving an invitation acceptance into the second PoC group communication session, facilitating the participation into the second PoC group communication session without terminating the first PoC group communication session.

In a specific approach, encrypted data packets of a PoC communication sub-session are communicated during a PoC communication session. If a key for the encrypted data packets is known by a mobile station, the encrypted data packets are decrypted to facilitate the PoC communication sub-session. Otherwise, the encrypted data packets are discarded. This approach facilitates multiple concurrent talk groups for an end user despite only a single PoC session being maintained by the network, to thereby save network resources.

The above-described embodiments of the present application are intended to be examples only. Those of skill in the art may effect alterations, modifications and variations to the particular embodiments without departing from the scope of the application. The invention described herein in the recited claims intends to cover and embrace all such changes in technology.

What is claimed is:

1. A method of facilitating Push-to-talk over Cellular (PoC) communication sessions between mobile stations adapted to communicate via wireless signals in a wireless communication network, comprising:
    maintaining, via the wireless network, a first Push-to-talk over Cellular (PoC) communication session between a first user group of mobile stations; and
    maintaining, via the wireless network, a second PoC communication session between a second user group of mobile stations concurrently while maintaining the first PoC communication session between the first user group of mobile stations, where at least a first mobile station is a common member with both the first user group and the second user group in the first and the second PoC communication sessions, and the first user group of mobile stations has at least a second mobile station which is a non-member of the second user group outside of the second PoC communication session.

2. The method of claim 1, wherein all members of the second user group are included in the first user group.

3. The method of claim 1, being performed by a PoC server.

4. The method of claim 1, being performed by the first mobile station which is the common member.

5. The method of claim 1, wherein the method is embodied in a computer program product comprising a computer storage medium and computer instructions stored in the computer storage medium.

6. The method of claim 1, further comprising:
    prior to concurrently maintaining the second PoC group communication session, receiving or sending an invitation for the second PoC group communication session; and
    wherein the act of concurrently maintaining the second PoC group communication session is in response to an invitation acceptance to the second PoC group communication session.

7. The method of claim 1, further comprising:
    receiving data packets from both the first and the second PoC group communication sessions;
    receiving an end user selection for communications associated with only one of the first and the second PoC group communication sessions at a time; and
    in response to the end user selection, causing data packets of only the selected PoC group communication session to be processed for outputting audible signals of only the selected PoC communication session.

8. The method of claim 1, further comprising:
    receiving data packets from both the first and the second PoC group communication sessions;
    receiving an end user selection for communications with both the first and the second PoC group communication sessions at the same time; and
    in response to the end user selection, causing data packets of both the first and second PoC group communication sessions to be processed and mixing audio signals of both the first and second PoC group communication sessions for output at a mobile station.

9. The method of claim 1, further comprising:
    receiving encrypted data packets of the second PoC communication session;
    if a decryption key for the encrypted data packets for the second PoC communication session is known, decrypting the encrypted data packets for the second PoC communication session; and
    if the decryption key of the encrypted data packets for the second PoC communication session is unknown, refraining from decrypting the encrypted data packets for the second PoC communication session.

10. The method of claim 1, further comprising:
    visually displaying an indication which indicates which one of the first and the second PoC group communication sessions is being processed for communications.

11. A mobile station, comprising:
    a wireless transceiver operative for communications using wireless signals via a wireless communication network;
    one or more processors coupled to the wireless transceiver;
    the one or more processors being operative with use of the wireless transceiver to:
        maintain a first Push-to-talk over Cellular (PoC) communication session between a first user group of mobile stations; and
        maintain a second PoC communication session between a second user group of mobile stations, concurrently while maintaining the first PoC communication session between the first user group of mobile stations, where the mobile station is a common member with both the first user group and the second user group in the first and the second PoC communication sessions, the first user group of mobile stations having at least one mobile station which is a non-member of the second user group outside of the second PoC communication session.

12. The mobile station of claim 11, wherein all members of the second user group are included in the first user group.

13. The mobile station of claim 11, wherein the one or more processors are further operative to:
    prior to concurrently maintaining the second PoC group communication session, receive or send an invitation for the second PoC group communication session; and
    wherein concurrently maintaining the second PoC group communication session is in response to an invitation acceptance to the second PoC group communication session.

14. The mobile station of claim 11, wherein the one or more processors are further operative to:
    receiving, via the wireless transceiver, data packets from both the first and the second PoC group communication sessions;
    receive an end user selection for communications associated with only one of the first and the second PoC group communication sessions at a time; and
    in response to the end user selection, cause data packets of only the selected PoC group communication session to be processed for outputting audible signals of only the selected PoC communication session.

15. The mobile station of claim 11, wherein the one or more processors are further operative to:
receiving, via the wireless transceiver, data packets from both the first and the second PoC group communication sessions;
receive an end user selection for communications with both the first and the second PoC group communication sessions at the same time; and
in response to the end user selection, cause the data packets of both the first and second PoC group communication sessions to be processed for outputting audible signals from both the first and the second PoC group communication sessions simultaneously.

16. The mobile station of 11, wherein the one or more processors are further operative to:
receive, via the wireless network, encrypted data packets of the second PoC communication session;
decrypt-the encrypted data packets for the second PoC communication session, if a decryption key for the encrypted data packets for the second PoC communication session is known; and
discard and refrain from decrypting the encrypted data packets for the second PoC communication session, if the key of the encrypted data packets for the second PoC communication session is unknown.

17. A Push-to-talk over Cellular (PoC) server of a wireless communication network, comprising:
one or more processors;
memory;
computer instructions stored in the memory;
the one or more processors being operative in accordance with the computer instructions to facilitate Push-to-talk over Cellular (PoC) communication sessions between mobile stations which are adapted to communicate via wireless signals in the wireless communication network by:
maintaining a first Push-to-talk over Cellular PoC communication session between a first user group of mobile stations; and
maintaining a second PoC communication session between a second user group of mobile stations, concurrently while maintaining the first PoC communication session between the first group of mobile stations, where at least a first mobile station is a common member with both the first user group and the second user group in the first and the second PoC communication sessions, and the first user group of mobile stations has at least a second mobile station which is a non-member of the second user group outside of the second PoC communication session.

18. The PoC server of claim 17, wherein all members of the second user group are included in the first user group.

19. The PoC server of claim 17, further comprising:
a first session ID corresponding to the first user group stored in the memory; and
a second session ID corresponding to the second user group stored in the memory.

20. The PoC server of claim 17, wherein the one or more processors are further operative for:
receiving data packets from both the first and the second PoC group communication sessions:
receiving a selection for communications associated with only one of the first and the second PoC group communication sessions at a time; and
in response to the selection, causing data packets of only the selected PoC group communication session to be processed for communications and discarding data packets of the other PoC group communication session.

21. The PoC server of claim 17, wherein the one or more processors are further operative for:
receiving data packets from both the first and the second PoC group communication sessions;
receiving a selection for communications with both the first and the second PoC group communication sessions at the same time; and
in response to the selection, causing the data packets of both the first and second PoC group communication sessions to be processed, mixing audio signals of both the first and second PoC group communication sessions, and sending data packets having the mixed audio signals to a mobile station.

22. The PoC server of claim 17, wherein the one or more processors are further operative to:
receiving encrypted data packets of the second PoC communication session.

23. A method in a mobile communication device of processing group communication sessions which are facilitated via a wireless communication network, the method comprising the acts of:
maintaining, by the mobile device, a first group communication session which is facilitated via the wireless network;
receiving, at the mobile device via the wireless network, an invitation into a second group communication session which is facilitated via the wireless network;
sending, from the mobile device via the wireless network, an invitation acceptance which accepts the invitation into the second group communication session;
in response to sending the invitation acceptance, participating, by the mobile device, in the second group communication session without terminating the first group communication session by:
receiving, via the wireless network, data packets from both the first and the second group communication sessions; and
causing the data packets of both the first and second group communication sessions to be processed for outputting, from the mobile device, audible signals of both the first and the second group communication sessions simultaneously.

24. The method of claim 23, wherein the first group communication session is a first Push-to-talk over Cellular (PoC) communication session and the second group communication session is a second PoC communication session.

25. The method of claim 23, wherein the first group communication session has a first user group of mobile stations and the second group communication session has a second user group of mobile stations, and the first user group includes at least one mobile station which is a non-member of the second user group outside of the second communication session.

26. The method of claim 23, further comprising:
visually displaying identifications of the first and the second group communication sessions being processed for communications.

* * * * *

UNITED STATES PATENT AND TRADEMARK OFFICE
CERTIFICATE OF CORRECTION

PATENT NO. : 7,668,149 B2
APPLICATION NO. : 10/789298
DATED : February 23, 2010
INVENTOR(S) : Zhao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1722 days.

Signed and Sealed this

Seventh Day of December, 2010

David J. Kappos
*Director of the United States Patent and Trademark Office*